United States Patent [19]

United States Patent [19]
Nagato

[11] Patent Number: 4,912,699
[45] Date of Patent: Mar. 27, 1990

[54] PULSE CODE MODULATION TERMINAL EQUIPMENT

[75] Inventor: Takashi Nagato, Kawasaki, Japan

[73] Assignee: Fujitsu Limited, Kawasaki, Japan

[21] Appl. No.: 352,403

[22] Filed: May 16, 1989

[30] Foreign Application Priority Data

May 17, 1988 [JP] Japan .................................. 63-119484

[51] Int. Cl.[4] ............................................... H04J 3/12
[52] U.S. Cl. .......................................... 370/13; 371/7; 370/110.1
[58] Field of Search ........................ 370/13, 110.1, 17; 371/7, 31

[56] References Cited

U.S. PATENT DOCUMENTS 3,851,311 11/1974 Mila ......................................... 371/7
4,558,317 12/1985 Armstrong ............................. 370/13
4,920,921 11/1975 Pitroda et al. ......................... 370/13

FOREIGN PATENT DOCUMENTS 42261 3/1982 Japan .
109442 7/1982 Japan .

*Primary Examiner*—Douglas W. Olms
*Assistant Examiner*—Min Jung
*Attorney, Agent, or Firm*—Staas & Halsey

[57] ABSTRACT

A pulse code modulation terminal equipment, having a first hold circuit which continuously supplies a multiplexer unit with a seizure signal supplied from a seizure supervisory circuit during a predetermined time after a fault is detected. The first hold circuit prevents the seizure signal from being supplied to the multiplexer unit after the lapse of the predetermined time. A second hold circuit continuously supplies a related trunk of an exchange with an answer signal supplied from an answer supervisory circuit even after the fault is detected.

28 Claims, 7 Drawing Sheets

FIG. I

PULSE CODE MODULATION TERMINAL EQUIPMENT

BACKGROUND OF THE INVENTION

1. Field of the Invention

The present invention generally relates to pulse code modulation terminal equipment, and in particular to a call processing which is to be executed in a pulse code modulation terminal equipment when a fault occurs in a pulse code modulation communication system.

Conventionally, a pulse code modulation (hereinafter simply referred to as a PCM) terminal equipment is used as a relay connected to an exchange in a communication system. As is well known, a PCM terminal equipment includes signal conversion panels (hereinafter referred to channel units), each of which includes an analog-to-digital (A/D) converter, a digital-to-analog (D/A) converter, and a signalling circuit. The signalling circuit processes various supervisory signals such as a seizure signal and an answer signal. Also, the PCM terminal equipment includes a multiplexer unit, which carries out time-division multiplexing and demultiplexing for voice signals and switch signals. For example, a PCM terminal equipment is constructed so as to conform to the CCITT (International Telegraph and Telephone Consultative Committe) recommendation G.732, which defines a 30-channel pulse code modulation system.

Further, the multiplexer unit ha the function of detecting a fault occurring in a multiplexed PCM signal supplied from another PCM terminal equipment. For example, when the multiplexer unit receives no multiplexed PCM signal from the PCM terminal equipment on the other side, it decides that a fault occurs in the system. Then, the signalling circuit in the source PCM terminal equipment sets a related line idle. Thereafter, the line in the idle state is blocked, and thereby prevented from being captured by an exchange.

It is noted that the multiplexer unit recognizes an interruption or hit of the received multiplexed PCM signal to be a fault thereof. It is to be noted that even when the multiplexed PCM signal is instantaneously interrupted, for example, for hundreds of milliseconds to a few seconds, this instantaneous interruption is recognized to be a fault, and the corresponding line is immediately set idle. In this case, if the related line is in an answer state, conversation is no longer continued. In the case where the line is set in the answer state, it is desired to keep the line i the connected state even when a hit occurs. Similarly, even if a hit occurs in a seizure state (off-hook state), the line is set idle. In this case, if the line is recovered from the fault, it is again switched to the connected state to establish a communication path. However, there is a possibility that the call may be connected to a different destination in error. From the above-mentioned reasons, in conventional PCM terminal equipments, it is difficult to use lines effectively and efficiently.

SUMMARY OF THE INVENTION

It is therefore a general object of the present invention to provide an improved pulse code modulation terminal equipment in which the above-mentioned disadvantages are eliminated.

A more specific object of the present invention is to provide a pulse code modulation terminal equipment capable of utilizing lines efficiently and effectively.

The above objects of the present invention are achieved by a pulse code modulation terminal equipment connected to an exchange including a switch and trunks, including a multiplexer unit for multiplexing digital signals and a seizure signal to generate a first multiplexed digital signal to be transmitted t another pulse code modulation terminal equipment for, demultiplexing a second multiplexed digital signal supplied from another pulse code modulation terminal equipment to thereby, generate digital signals and an answer signal, and for detecting a fault in the second multiplexed digital signal to thereby generate a fault detection signal. A fault supervisory circuit, which is connected to the multiplexer unit, detects whether or not the fault detection signal is output from the multiplexer unit and passes the fault detection signal when it is detected. A seizure supervisory circuit, which is connected to one of the trunks, detects whether or not the seizure signal is output from that one trunk and passes the seizure signal when it is detected. An answer supervisor circuit, which is connected to the multiplexer unit, detects whether or not the answer signal is output from the multiplexer unit and passes the answer signal when it is detected. A first hold processing circuit, which is connected to the fault supervisory circuit and the seizure supervisory circuit, continuously supplies the multiplexer unit with the seizure signal supplied from the seizure supervisory circuit during a predetermined time after the fault supervisory circuit detects the fault detection signal supplied from the multiplexer unit, and prevents the seizure signal from being supplied to the multiplexer unit after the lapse of the predetermined time. A second hold processing circuit, which is connected to the fault supervisory circuit and the answer supervisory circuit, continuously supplies the related one of the trunks with the answer signal supplied from the answer supervisory circuit even after the fault supervisory circuit detects the fault detection signal.

The above-mentioned objects of the present invention can also be achieved by a pulse code modulation terminal equipment connected to an exchange including a switch and trunks, including a multiplexer unit for multiplexing digital signals and an answer signal to thereby generate a first multiplexed digital signal to be transmitted to another pulse code modulation terminal equipment for, demultiplexing a second multiplexed digital signal supplied from another pulse code modulation terminal equipment to thereby generate digital signals and a seizure signal, and detecting a fault in the second multiplexed digital signal to thereby generate a fault detection signal. A fault supervisory circuit, which is connected t the multiplexer unit, detects whether or not the fault detection signal is output from the multiplexer unit and passes the fault detection signal when it is detected. A seizure supervisory circuit, which is connected to the multiplexer unit, detects whether or not the seizure signal is output from the multiplexer unit and passes the seizure signal when it is detected. An answer supervisory circuit, which is connected to the related one of the trunks, detects whether or not the answer signal is output from the related one trunk and passes the answer signal when it is detected. A first hold processing circuit, which is connected to the fault supervisory circuit and the seizure supervisory circuit, continuously supplies the related one trunk with the seizure signal supplied from the seizure supervisory circuit during a predetermined time after the fault supervisory circuit detects the fault detection signal supplied from the multiplexer unit, and prevents the seizure signal from being supplied to the related one trunk after the lapse of the predetermined time. A second hold processing circuit, which is connected to the fault supervisory circuit and the answer supervisory circuit, continuously supplies the multiplexer unit with the answer signal supplied from the answer supervisory circuit even after the fault supervisory circuit detects the fault detection signal.

Other objects, features and advantages of the present invention will become apparent from the following detailed description when read in conjunction with the accompanying drawings.

DESCRIPTION OF THE PREFERRED EMBODIMENTS

A description is given of a communication system having a PCM terminal equipment.

Figure 1:
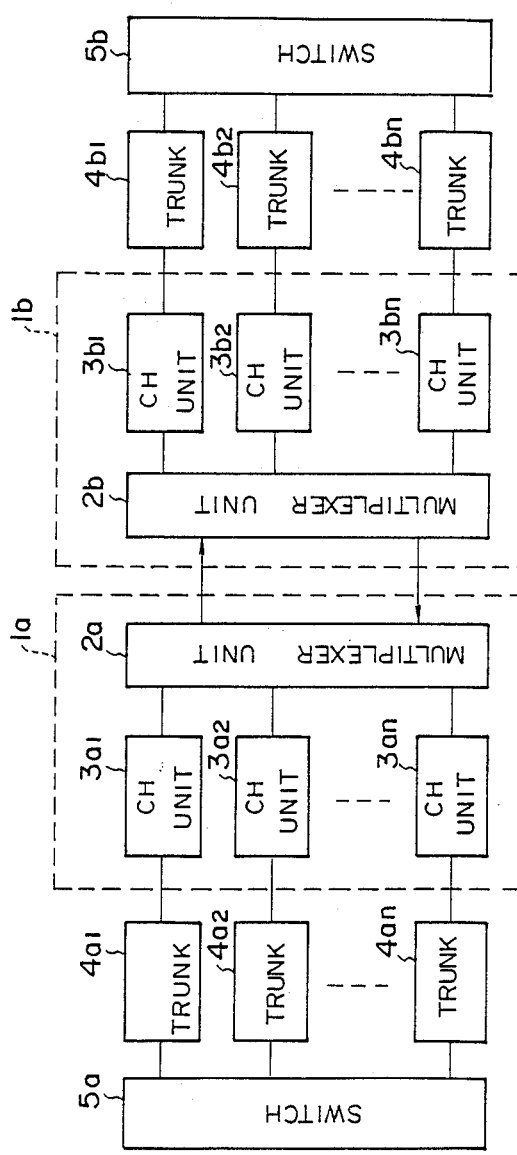
FIG. 1 is a block diagram of a communication system having equipments.

Referring to FIG. 1, there is illustrated a communication system having PCM terminal equipments 1a and 1b, which are mutually coupled through a PCM line. The PCM terminal equipment 1a includes a multiplexer unit 2a, and channel units 3a1, 3a2, ..., 3an. Similarly, the PCM terminal equipment 1b includes a multiplexer unit 2b, and channel units 3b1, 3b2, ..., 3bn. The channel units 3a1, 3a2, ..., 3an amounting to n channels, are coupled to a switch 5a through trunks 4a1, 4a2, ..., 4an, respectively. Each of trunks 4a1, 4a2, ..., 4an includes incoming trunks and outgoing trunks. Similarly, the channel units 3b1, 3b2, ..., 3bn of the PCM terminal equipment lb are coupled to a switch 5b through trunks 4b1, 4b2, ..., 4bn, respectively, each of which includes incoming trunks and outgoing trunks. The switches 5a and 5b accommodate a number of subscribers through telephone lines.

The channel units 3a1, 3a2, ..., 3an provided in the PCM terminal equipment 1a convert analog voice signals supplied from trunks 4a1, 4a2, ..., 4an to digital voice signals (PCM signals) to be supplied to the multiplexer unit 2a, and on the other hand, convert digital voice signals from the multiplexer unit 2a to analog voice signals to be supplied to the trunks 4a1, 4a2, ..., 4an. Each of the channel units 3a1, 3a2, ..., 3an also includes a signalling circuit, which processes switch signals such as a seizure signal and an answer signal. The multiplexer unit 2a of the PCM terminal equipment 1a carries out time-division multiplexing for the digital voice signals supplied from the channel units 3a1, 3a2, ..., 3an, and on the other hand, carries out time-division demultiplexing for multiplexed PCM signals supplied from the multiplexer unit 2b of the PCM terminal equipment 1b. Further, the multiplexer unit 2a has the function of multiplexing switch signals and the multiplexed PCM voice signal to be supplied to the PCM terminal equipment, and the function of extracting (demultiplexing switch signals from the multiplexed PCM signal sent from the PCM terminal equipment 1b.

The channel units 3b1, 3b2, ..., 3bn provided in the PCM terminal equipment 1b operate in the same way as the channel units 3a1, 3a2, ..., 3an.

A description is now given of a conventional structure for the channel unit 3a1 and the multiplexer unit 2a in order to facilitate the understanding of the present invention. The multiplexer unit 2a includes a voice multiplexer 7, a voice demultiplexer 8, a signalling multiplexer 9, and a signalling demultiplexer 10. The channel unit 3a1 includes a seizure supervisory circuit 12, and an answer supervisory circuit 13 in addition to a CODEC including an A/D converter and D/A converter (not shown in FIG. 2). The voice multiplexer (MUX) 7 is a 30-voice channel multiplexer, which is constructed in conformity with CCITT recommendation G.732, for example. The multiplexer 7 of the PCM terminal equipment la generates a multiplexed PCM signal (voice signal) of a bit rate of 2.048 Mbps from the digital voice signals amounting to 30 channels supplied from the channel units 3a1, 3a2, ..., 3an. The multiplexed PCM signal is sent to the multiplexer unit 2b of the PCM terminal equipment 1b through the signalling multiplexer 9. The demultiplexer (DMUX) 8 of the PCM terminal equipment 1a generates demultiplexed digital voice signals amounting to 30 channels from a 2.048-Mbps multiplexed PCM signal supplied from the multiplexer 77 of the PCM terminal equipment 1b through the signalling demultiplexer 10. The signalling multiplexer 9 multiplexes a seizure signal derived from the seizure supervisory signal 12 into the multiplexed PCM signal relating to voice. The signalling demultiplexer 10 extracts switch signals from the multiplexed PCM signal supplied from the PCM terminal equipment 1b.

As is well known the voice demultiplexer 8 has the function of detecting a fault occurring in the multiplexed PCM signal supplied from the PCM terminal equipment 1b. The detection of a fault depends on whether or not a hit occurs. When detecting a hit, the demultiplexer 8 outputs a fault detection signal, which is supplied to the seizure supervisory circuit 12 and the answer supervisory circuit 13.

The seizure supervisory circuit 12 monitors whether or not a seizure signal is output from the trunk 4a1. A seizure signal is generated in response to a call signal generated by the off-hook condition for a caller. When there is no fault, the seizure supervisory circuit 12 sends the seizure signal received from the trunk 4a1 to the signalling multiplexer 9. Then, the seizure signal is inserted into the multiplexed PCM signal relating to voice supplied from the voice multiplexer 7. The answer supervisory circuit 13 monitors whether or not an answer signal is supplied from the signalling demultiplexer 10. When no fault occurs, the answer supervisory circuit 13 sends the received answer signal to the trunk 4a1.

When a fault is detected in the seizure state, the seizure supervisory circuit 12 is supplied with both the seizure signal and the fault detection signal. At this time, the seizure supervisory circuit 12 stops passing the seizure signal supplied from the trunk 4a1. Thereby, the PCM terminal equipment 1b is informed of the intentional interruption of the seizure signal through the signalling multiplexer 9 and the PCM line. Then, the related line is set idle. Thereafter the switch 5b blocks the related line in order to prevent the related line from being captured by the switch 5b.

On the other hand, when a fault is detected in the answer state, the answer supervisory circuit 13 is supplied with both the answer signal and the fault detection signal. At this time, the answer supervisory circuit 13 stops passing the answer signal supplied from the signalling demodulator 10. Thereby, the trunk 4a1 becomes supplied with no answer signal. Thus, the related line is set idle.

Figure 2:
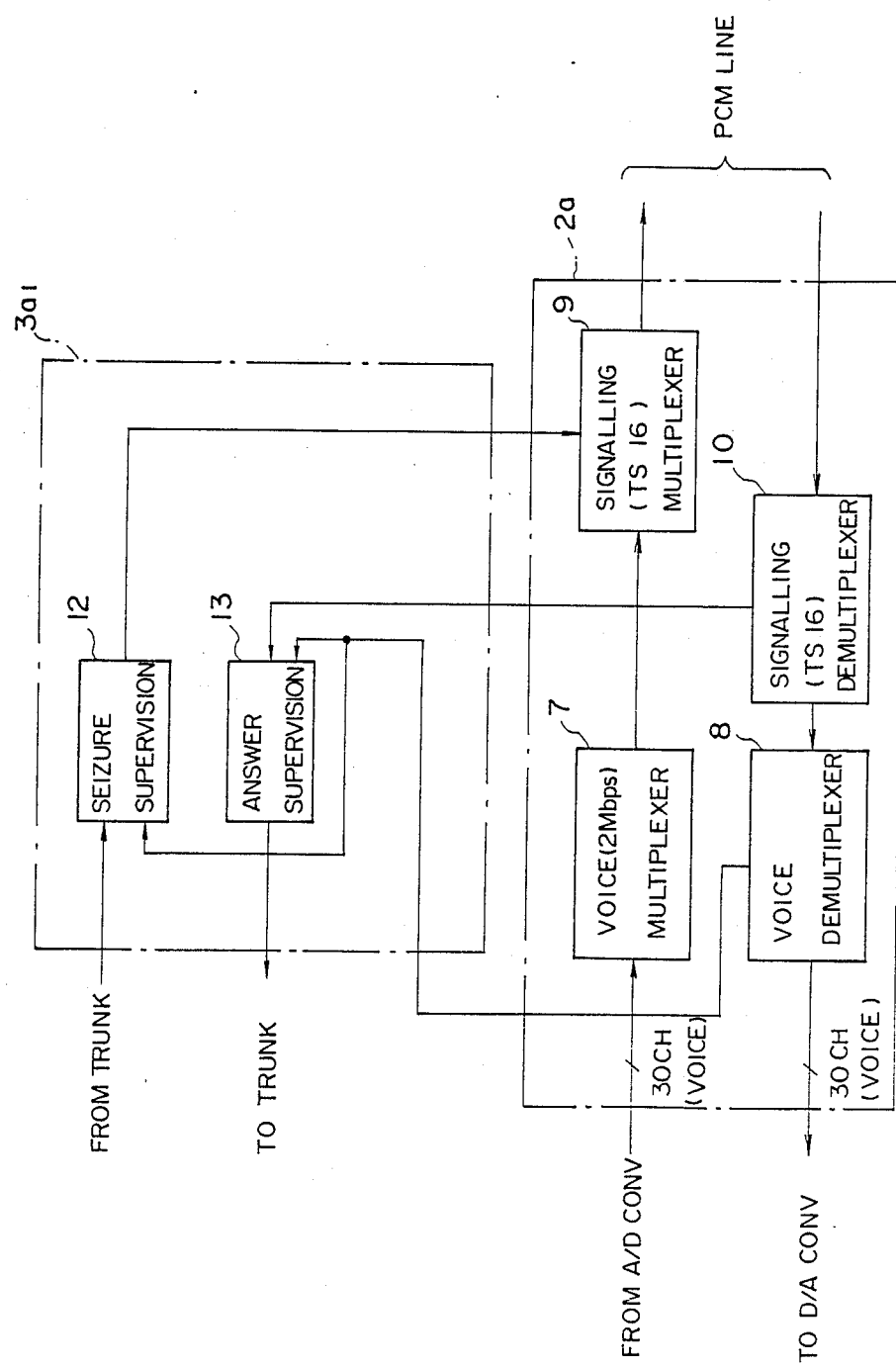
FIG. 2 is a block diagram of an essential part of a multiplexer unit used in a conventional PCM terminal equipment.

However, the conventional structure shown in FIG. 2 has the aforementioned disadvantages to be overcome. The disadvantages are further described below. The voice demultiplexer 8 recognizes a hit in the order of hundreds of milliseconds to a few seconds to be a fault. At this time, if the related line is already in the seizure state, the related line is set idle and disconnected from the connected state. Similarly, if the related line is already in the answer state, the related line is set idle and disconnected from the connected state. However, it is to be noted that there is a possibility that a hit in the order o hundreds of milliseconds to a few seconds may frequently occurs. For example, the quality of PCM lines is not good, the above-mentioned hit may frequently occur. It is not preferable that speech communication is prevented in the response state due to the hit in the order of hundreds of milliseconds to a few seconds. In other words, it is desired that speech communication is maintained even if the hit occurs. When the line is in the seizure state and is released from a fault, the line becomes set in the connected state. At this time, there is a possibility that a call may be connected to a different subscriber in error. The present invention intends to overcome the above-mentioned disadvantages.

Figure 3:
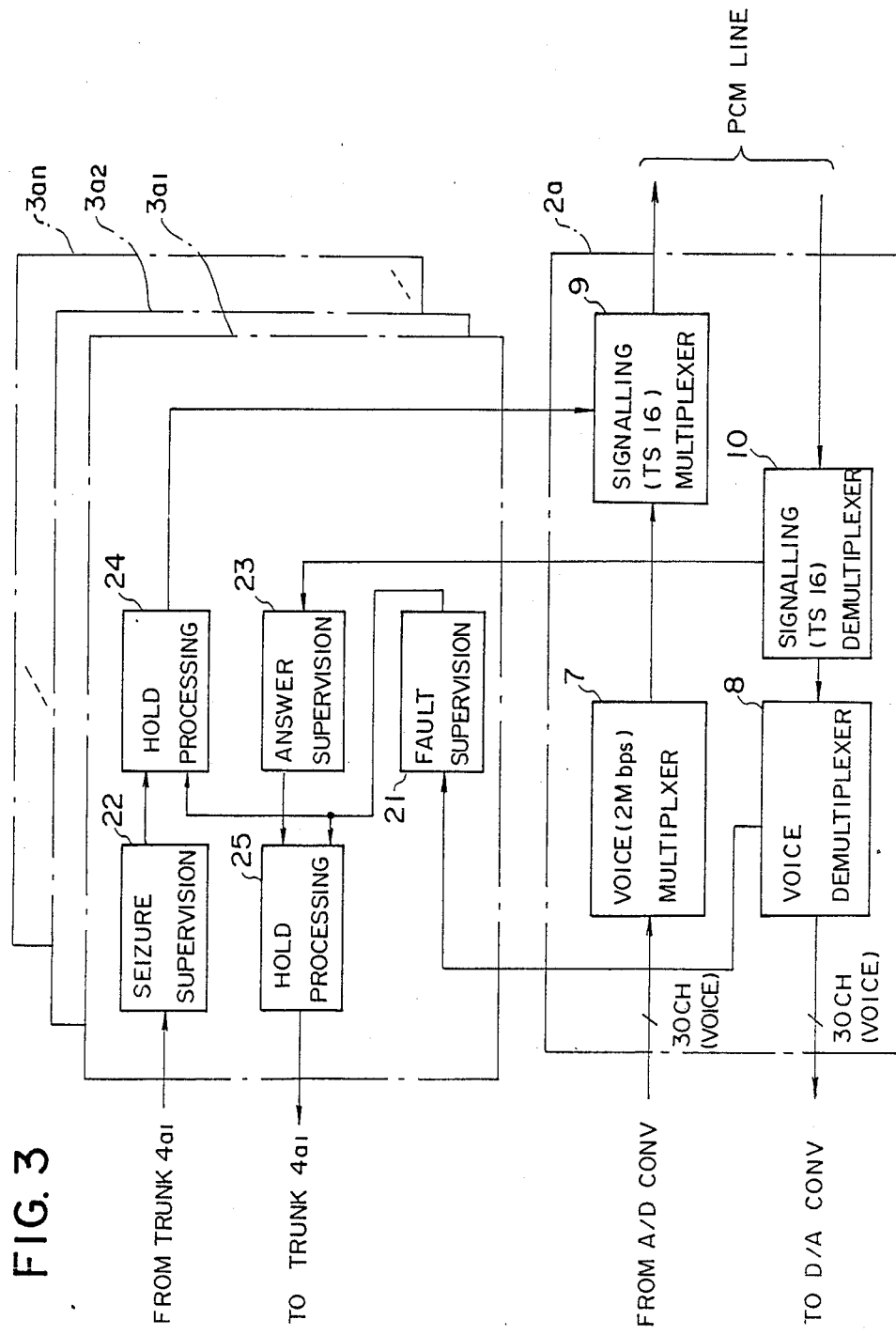
FIG. 3 is a block diagram of an essential part of a PCM terminal in a preferred embodiment of the present invention.

A description is given of a preferred embodiment of the present invention with reference to FIG. 3, in which those parts which are the same as those in FIG. 2 are given the same reference numerals.

Referring to FIG. 3, there is illustrated an example of the structure for the channel unit 3a1 together with the multiplexer unit 2a provided in the PCM terminal equipment 1a shown in FIG. 1. The channel unit 3a1 includes a fault supervisory circuit 21, a seizure supervisor circuit 22, an answer supervisory circuit 23, and hold processing circuits 24 and 25. The fault supervisory circuit 21 monitors whether or not the fault detection signal is output from the voice demultiplexer 8. When receiving the fault detection signal, the fault supervisory circuit 21 passes the fault detection signal. It is noted that the fault detection signal derived from the voice demultiplexer 8 is supplied, through the fault supervisory circuit 21, to each of the channel units 3a1, 3a2, ..., 3an. Then, the fault detection signal is supplied to the hold processing circuits 24 and 25, which are associated with the seizure supervisory circuit 22 and the answer supervisory circuit 23, respectively. The seizure supervisory circuit 22 receives the seizure signal supplied from the trunk 4a1, and supplies the received seizure signal to the hold processing circuit 24. The hold processing circuit 24 passes the seizure signal supplied from the seizure supervisory circuit 22, when no fault detection signal is supplied thereto. On the other hand, the hold processing circuit 24 operates as follows, when the fault signal is supplied thereto in the case where the seizure signal is being supplied thereto. In this case, the hold processing circuit 24 holds the seizure signal during a predetermined time. Therefore, during this time, the seizure signal is continuously supplied to the signalling multiplexer 9. Thereafter, the hold processing circuit 24 prevents the seizure signal from being supplied to the signalling multiplexer 9. The above-mentioned predetermine time is set equal to 2 to 3 seconds, for example. It depends on various conditions such as the line quality and requirements by users. On the other hand,, when the fault detection signal is supplied to the hold processing circuit 24 before the seizure signal is supplied thereto, the seizure signal is prevented from being supplied to the signalling multiplexer 9 at the time of the occurrence of the fault.

The answer supervisory circuit 23 receives the related answer signal from the signalling demultiplexer 10, and supplies the hold processing circuit 25 with the received answer signal. The hold processing circuit 25 passes the answer signal from the 23, when n fault occurs. In the state where the answer signal is being supplied to the hold processing circuit 25, even if the fault signal is supplied thereto, the hold processing circuit 25 passes the answer signal. On the other hand, when the fault detection signal is supplied to the hold processing circuit 25 before the answer signal is supplied thereto, the hold processing circuit 25 prevents the answer signal from being supplied to the trunk 4a1.

Referring to FIG. 4(A), the fault detection signal becomes ON at time $t_1$. At this time, the fault detection signal is switched from a positive power source level to around level, for example. FIG. 4(A) shows a continuous fault. The fault detection signal of FIG. 4(A) is supplied to the hold processing circuits 24 and 25 through the fault supervisory circuit 21. It is now assumed that as shown in FIG. 4(C), the seizure signal supplied to the seizure supervisory circuit 22 has already been turned ON when the fault detection signal is turned ON at time $t_1$. Therefore, the hold processing circuit 24 continues to output the seizure signal during the predetermined time, 2 to 3 seconds, for example. Then, the hold processing circuit 24 prevents the seizure signal from being supplied to the signalling multiplexer 9. This change of the seizure signal is sent to the switch 5b (FIG. 1) through the signalling multiplexer 9, the PCM line, and the PCM terminal equipment 1b. Thereby, the related line is set idle and disconnected from the line connection in a conventional way.

It is also assumed that as shown in FIG. 4(B), the answer signal supplied to the answer supervisory circuit 23 has already been turned ON when the fault detection signal is turned ON at time $t_1$. Therefore, the hold processing circuit 25 continues to pass the answer signal, as shown in FIG. 4(B). Thereby, the line is maintained in the connected state, so that conversation is not prevented irrespective of the occurrence of the fault. In this case, the subscriber connected to the switch 5a cannot receive any voice. Therefore, the receiver will spontaneously put back the handset. Thereby, the line returns to the idle state. In FIGS. 4(B) and 4(C), broken lines show conventional signal changes in the conventional method.

It is now assumed that as shown in FIG. 5(A), a fault occurs for a time T, which is shorter than the predetermined time. That is, the fault detection signal is held ON for the time T. FIG. 5(B) shows the case where the answer signal has already been supplied to the answer supervisory circuit 23 when the fault signal shown in FIG. 5(A) is turned ON at time $t_1$. In this case, the answer signal is continuously supplied to the trunk $4a1$ from the hold processing circuit 25 in the same way as in the case of the answer signal shown in FIG. 4(B). As shown in FIG. 5(C), the seizure signal has already been supplied to the seizure supervisory circuit 22 when the fault signal shown in FIG. 5(A) is turned 0N at time $t_1$. Since the fault occurs during the time T shorter than the predetermined time, the hold processing circuit 24 continuously outputs the seizure signal. In FIGS. 5(A) and 5(B), broken lines show corresponding signal changes in the conventional method.

Figure 4:
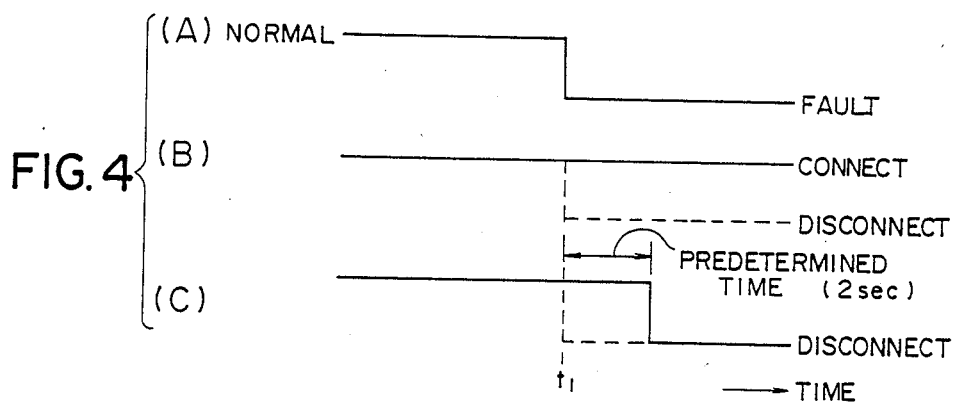
FIG. 4 is a waveform diagram illustrating operation of the embodiment of FIG. 3.
Figure 5:
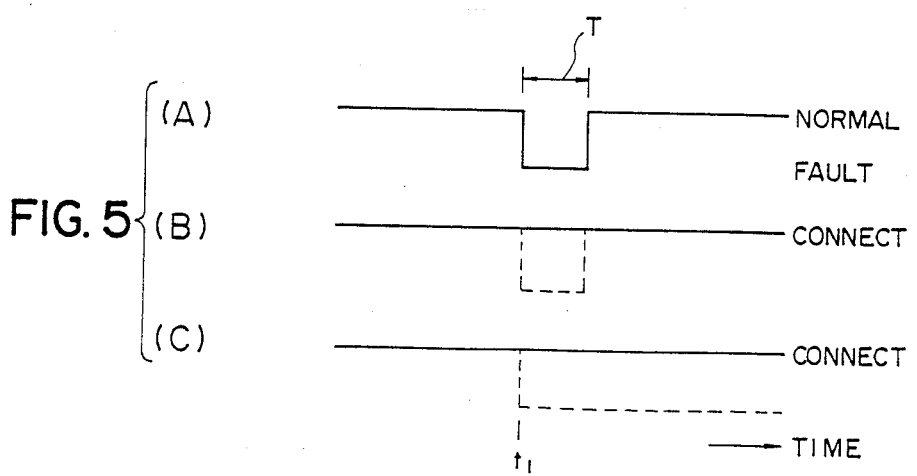
FIG. 5 is another waveform diagram illustrating operation of the embodiment of FIG. 3.
Figure 6:
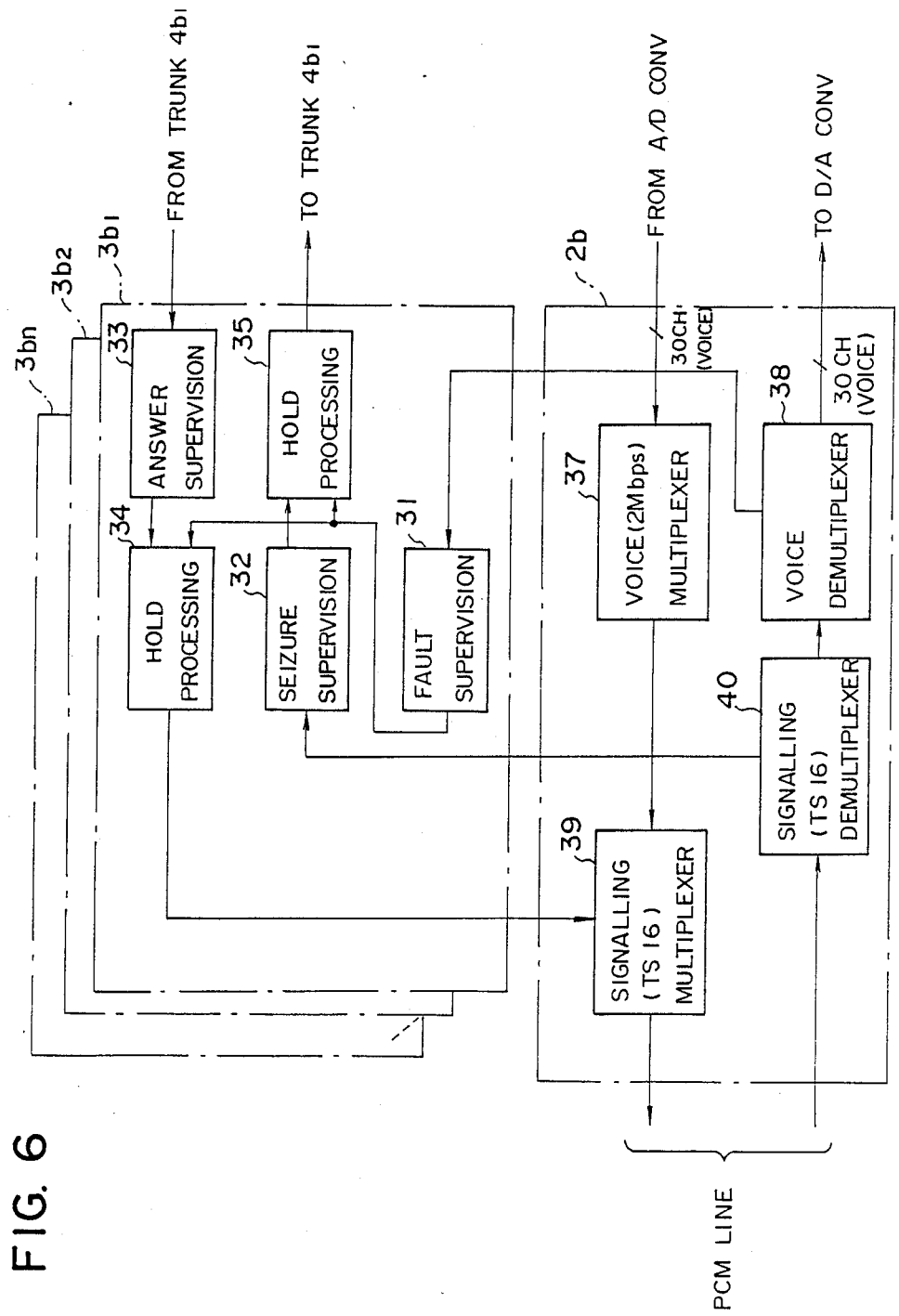
FIG. 6 is a block diagram of an essential part of another PCM equipment in the embodiment of FIG. 3.

FIG. 6 illustrates an example of the structure for the multiplexer unit $2b$ and the channel unit $3b1$ provided in the PCM terminal equipment $1b$. The multiplexer unit $2b$ includes a voice multiplexer 37, a voice demultiplexer 38, and signalling circuits 39 and 40. Each of those circuits can operate in the same way as the corresponding circuit shown in FIG.3. The channel unit $3b1$ includes a fault supervisory circuit 31, a seizure supervisory circuit 32, an answer supervisory circuit 33, and hold processing circuits 34 and 35, in the same way as the channel unit $3a1$ shown in FIG. 3. Each of those circuits 31 to 35 operates in the same way as the corresponding circuit shown in FIG. 3. The seizure supervisory circuit 32 receives a seizure signal from the signalling demultiplexer 10, and sends it to the hold processing circuit 35. The seizure signal from the hold processing circuit 35 is supplied to the trunk $4b1$ in the same way as in the case of FIG. 3. An answer signal is supplied to the answer supervisory circuit 33 from the trunk $4b1$. The channel unit $3b1$ operates as shown in FIGS. 4 and 5. The other channel units may be constructed in the same way as the above-mentioned channel unit $3b1$.

Figure 7:
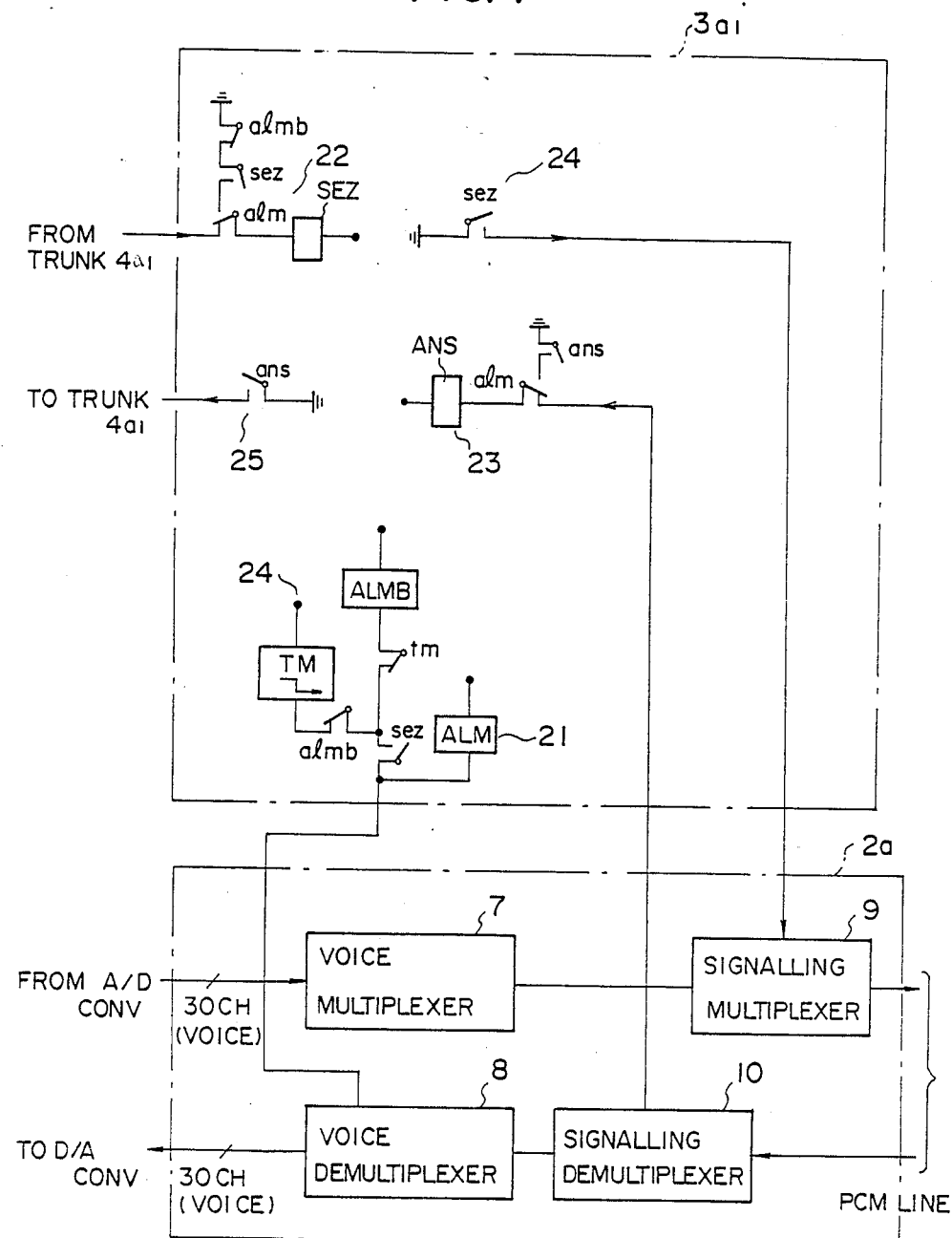
FIG. 7 is a circuit diagram of the configuration shown in FIG. 3.

A description is given of an example of the structure for the channel unit $3a1$ shown in FIG. 3. Referring to FIG. 7, the fault supervisory circuit 21 includes a relay ALM having a couple of two-position switches 'alm'. The seizure supervisory circuit 22 includes a relay SEZ connected to a positive power source. The relay SEZ has three make-contacts 'sez'. The hold process, circuit 24 includes a timer TM having a break-contacts 'tm', a relay ALMB having two break-contacts 'almb' and one of the make-contacts 'sez' which is connected to ground. The answer supervisory circuit 23 includes a relay ANS connected to the positive power source, and one of the switches 'alm'. The relay ANS has two make contacts 'ans'. The hold processing circuit 25 includes one of the make-contacts 'ans' connected to ground. Hereinafter, break-and make contacts are simply referred to as contacts.

When a related line is switched to the seizure state, the seizure signal from the trunk $4a1$ is changed to ground level, and applied to the relay SEZ through the contact 'alm'. It is now assumed that at this time, no fault is detected by the voice demultiplexer 8. In this case, the relay ALM is supplied with the fault detection signal held at the positive power source level (hereinafter simply referred to a positive level), and its contacts 'alm' are held closed. The relay SEZ is a relay having a timer circuit, and holds the previous state thereof during a fixed time after a fault occurs. When the line is set in the seizure state, the contacts 'sez' are closed. Thus, the seizure signal is supplied to the signalling circuit 9, and is then sent to the PCM terminal equipment $1b$ and the switch $5b$.

It is assumed that the fault detection signal is supplied to the fault supervisory circuit 21 from the voice demultiplexer 8 after the seizure signal is turned ON. At this time, the fault detection signal is switched to ground level Thereby, the relay ALM starts operating, and the contacts thereof are made open. Then, the fault detection signal, set to ground level, is supplied to the timer TM through the contacts 'sez' and 'almb'. Thereby, the timer TM starts operating. The timer TM is a timer which counts two seconds, which correspond to the aforementioned fixed time. The timer TM makes its contact 'tm' open when the fault detection signal is supplied thereto, and then makes the contact 'tm' closed after the lapse of two seconds. The relay ALMB does no operate until the timer TM is turned ON. Therefore, the relay SEZ is continuously supplied with ground level through the contacts 'almb', 'sez' and 'alm'. Thus, the seizure signal is continuously supplied to the signalling multiplexer 9.

When the timer TM is turned OFF after two seconds, its contact 'tm' is made closed. Therefore, the relay ALMB starts operating, and the contacts 'almb' thereof are made open. Thereby, the relay SEZ is disconnected from ground, and thus stops operating. Therefore, the contacts 'sez' of the relay SEZ are made open, and the supply of the seizure signal to the signal inserting circuit 11 is prevented. In this manner, the line is disconnected from the line connection. The above-mentioned operation corresponds to the operation illustrated in FIGS. 4(A), 4(C), 5(A) and 5(C).

When the answer signal is turned ON, it is switched to ground level. When no fault is detected by the voice demultiplexer 8, the answer signal is supplied to the relay ANS through the contact 'alm'. Thereby the contact 'ans' of the relay ANS is made closed, and the answer signal is supplied to the trunk $4a1$. Thereafter if the fault detection signal is turned ON, the relay ALM starts operating. The relay ANS includes a timer circuit, and therefore can maintain its previous state for a while after the relay ALM is turned ON. Therefore, even when the relay ANS is supplied with ground level through the contact 'ans' the relay ANS is continuously held ON. As a result, the trunk $4a1$ is continuously supplied with the answer signal. The above-mentioned operation corresponds to the operation illustrated in FIGS. 4(A), 4(B), 5(A) and 5(B).

Figure 8:
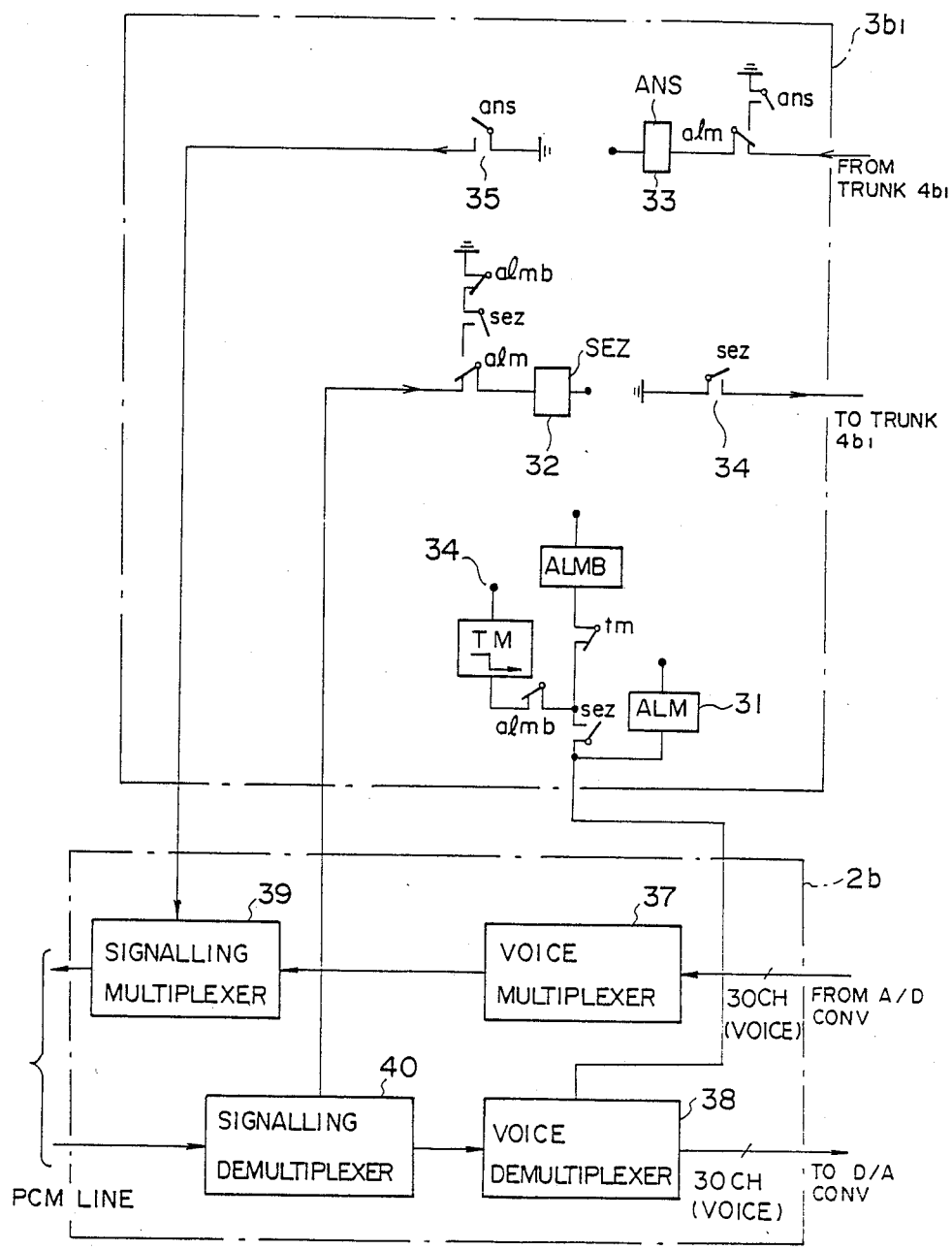
FIG. 8 is a circuit diagram of the configuration shown in FIG. 6.

FIG. 8 illustrates an example of the structure for the channel unit $3b1$ provided in the PCM terminal equipment $1b$. The channel unit $3b1$ includes the same structural elements as the channel unit $3a1$, and operates in the same way as the channel unit $3a1$. The fault supervisory circuit 31 include a relay ALM having a couple of two-position switches 'alm'. The seizure supervisory circuit 32 includes a relay SEZ connected to a positive power source. The relay SEZ has three make contacts 'sez'. The hold process circuit 34 includes a timer TM having a break contact 'tm' a relay ALMB having two brea contacts 'almb' and one of the make contacts 'sez' which is connected to ground. The answer supervisory circuit 33 includes a relay ANS connected to the positive power source, and one of the switches 'alm'. The relay ANS has two make contacts ans, The hold processing circuit 35 includes one of the make contacts 'ans' connected to ground.

The seizure signal from the signalling demultiplexer 40 is supplied to the relay SEZ through the contact 'alm', and is supplied to the trunk $4b1$ through the contact 'sez'. The answer signal from the trunk $4b1$ is supplied to the relay ANS through the contact 'alm', and to the signalling multiplexer 39 through the contact 'ans'.

The PCM terminal equipment 1a includes the structure shown in FIGS. 6 and 8, and on the other hand, the PCM terminal equipment 1b includes the structure shown in FIGS. 3 and 7. In the alternative, it is possible to form the essential part of the channel units shown in FIGS. 3, 6 to 8 by software.

In the above-mentioned embodiments, the predetermined time during which the seizure signal is maintained ON, is not limited to 2 seconds. The predetermined time may be set equal to a time during which it is desired that said seizure signal is continuously supplied to said means even if said fault occurs.

The present invention is not limited to the embodiments, and variations and modifications may be made without departing from the scope of the present invention.

What is claimed is:

1. A pulse code modulation terminal equipment connected to an exchange including a switch and trunks, comprising:
   multiplexer means for multiplexing digital signals and a seizure signal to thereby output a first multiplexed digital signal to be transmitted to another pulse code modulation terminal equipment, for demultiplexing a second multiplexed digital signal supplied from another pulse code modulation terminal equipment to thereby output digital signals and an answer signal, and for detecting a fault in said second multiplexed digital signal to thereby generate a fault detection signal;
   fault supervising means, connected to said multiplexer means, for detecting whether or not said fault detection signal is output from said multiplexer means and for passing said fault detection signal when it is detected;
   seizure supervising means, connected to one of said trunks, for detecting whether or not said seizure signal is output from said one of said trunks and for passing said seizure signal when it is detected;
   answer supervising means, connected to said multiplexer means, for detecting whether or not said answer signal is output from said multiplexer means and passing said answer signal when it is detected;
   first holding means, connected to said fault supervising means and said seizure supervising means, for continuously supplying said multiplexer means with said seizure signal supplied from said seizure supervising means during a predetermined time after said fault supervising means detects said fault detection signal supplied from said multiplexer means and for preventing said seizure signal from being supplied to said multiplexer means after the lapse of said predetermined time; and
   second holding means, connected to said fault supervising means and said answer supervising means, for continuously supplying said one of said trunks with said answer signal supplied from said answer supervising means even after said fault supervising means detects said fault detection signal.

2. A pulse code modulation terminal equipment as claimed in claim 1, wherein said pulse code modulation terminal equipment comprises a plurality of channel units each provided for one of said trunks of said exchange, and each of said channel unit comprises said fault supervising means, said seizure supervising means, said answer supervising means, said first holding means, and said second holding means.

3. A pulse code modulation terminal equipment as claimed in claim 1, wherein said predetermined time is set equal to a time during which it is desired that said seizure signal is continuously supplied to said multiplexer means even if said fault occurs.

4. A pulse code modulation terminal equipment as claimed in claim 1, wherein said multiplexer means comprises a first relay, which is turned ON when said fault detection signal is generated by said multiplexer means.

5. A pulse code modulation terminal equipment as claimed in claim 4, wherein said first relay has a first two-position switch having first and second positions, and said seizure supervising means comprises a second relay t which said seizure signal from said one of said trunks is supplied through the first position of said first two-position switch of said first relay when said first relay is OFF.

6. A pulse code modulation terminal equipment as claimed in claim 5, wherein said first holding means comprises first means for continuously supplying said second relay with a hold signal used for keeping said second relay ON during said predetermined time.

7. A pulse code modulation terminal equipment as claimed in claim 6, wherein said first means comprises a timer for counting said predetermined time, and a third relay which is turned ON after said predetermined time defined by said timer, wherein said second relay has a first make-contact and said third relay has a first break-contact, and wherein said hold signal is set to a fixed level, and is supplied to said second relay for passing through said first break-contact of said third relay, said first make-contact of said second relay, and the second position of said first two-position switch of said first relay.

8. A pulse code modulation terminal equipment a claimed in claim 5, wherein the second relay of said first holding means includes a second contact which supplies said multiplexer means with said fixed level when the second relay is ON.

9. A pulse code modulation terminal equipment as claimed in claim 7, wherein said timer has a break-contact and said third relay has a second break contact, and wherein said fault detection signal is supplied to said timer through the second break-contact of said third relay, and is supplied to said third relay through the break-contact of said timer.

10. A pulse code modulation terminal equipment as claimed in claim 9, wherein said second relay has a third make-contact, and wherein said fault detection signal passes through the third make contact of said second relay, and the second break-contact of said third rely, and is supplied to said timer, whereby said timer is turned ON when the fault detection signal is output from said multiplexer means.

11. A pulse code modulation terminal equipment as claimed in claim 5, wherein said first relay has a second two-position switch having first and second positions, and wherein said answer supervising means comprises a fourth relay to which said answer signal is supplied through the first position of said two-position switch of said fault.

12. A pulse code modulation terminal equipment as claimed in claim 11, wherein said fourth relay has a first make-contact, and said second holding means comprises the first make contact of said fourth relay through which a fixed level is supplied, as said answer signal, to the said one of said trunks.

13. A pulse code modulation terminal equipment as claimed in claim 12, wherein said fourth relay has a second make-contact, through which said fixed level is applied to the second position of said second two-position switch of said first relay.

14. A pulse code modulation terminal equipment as claimed in claim 1, wherein each of said first and second multiplexed digital signals is a multiplexed pulse code modulation signal.

15. A pulse code modulation terminal equipment connected to an exchange including a switch and trunks, comprising:

multiplexer means for multiplexing digital signals and a seizure signal to thereby output a first multiplexed digital signal to be transmitted to another pulse code modulation terminal equipment, for demultiplexing a second multiplexed digital signal supplied from another pulse code modulation terminal equipment to thereby output digital signals and a seizure signal, and for detecting a fault in said second multiplexed digital signal to thereby generate a fault detection signal;

fault supervising means, connected to said multiplexer means, for detecting whether or not said fault detection signal is output from said multiplexer means and for passing said fault detection signal when it is detected;

seizure supervising means, connected to said multiplexer means, for detecting whether or not said seizure signal is output from said multiplexer means and for passing said seizure signal when it is detected;

answer supervising means, connected to said one of said trunks, for detecting whether or not said answer signal is output from said one of said trunks and for passing said answer signal when it is detected;

first holding means, connected to said fault supervising means and said seizure supervising means, for continuously supplying said one of said trunks with said seizure signal supplied from said seizure supervising means during a predetermined time after said fault supervising means detects said fault detection signal supplied from said multiplexer means and for preventing said seizure signal from being supplied to said one of said trunks after the lapse of said predetermined time; and second holding means, connected to said fault supervising means and said answer supervising means, for continuously supplying said multiplexer means with said answer signal supplied from said answer supervising means even after said fault supervising means detects said fault detection signal.

16. A pulse code modulation terminal equipment as claimed in claim 15, wherein said pulse code modulation terminal equipment comprises a plurality of channel units each provided for one of said trunks of said exchange, and each of said channel unit comprises said fault supervising means, said seizure supervising means, said answer supervising means, said first holding means, and said second holding means.

17. A pulse code modulation terminal equipment as claimed in claim 15, wherein said predetermined time is set equal to a time during which it is desired that said seizure signal is continuously supplied to said one of said trunks even if said fault occurs.

18. A pulse code modulation terminal equipment as claimed in claim 15, wherein said fault detection means comprises a first relay, which is turned ON when said fault detection signal is supplied from said multiplexer means.

19. A pulse code modulation terminal equipment as claimed in claim 18, wherein said first relay has a first two-position switch having first and second positions, and said seizure supervising means comprises a second relay to which said seizure signal from said multiplexer means is supplied through the first position of said first two-position switch of said first relay when said first relay is OFF.

20. A pulse code modulation terminal equipment as claimed in claim 19, wherein said first holding means comprises first means for continuously supplying said second relay with a hold signal used for keeping said second relay ON during said predetermine time.

21. A pulse code modulation terminal equipment as claimed in claim 20, wherein said first means comprises a timer for counting said predetermined time, and a third relay which is turned ON after said predetermined time defined by said timer, wherein said second relay has a first make contact and said third relay has a first break contact, and wherein said hold signal is set to a fixed level, and is supplied to said second relay through said first break contact of said third relay, said first make contact of said second relay, and the second position of said first two-position switch of said first relay.

22. A pulse code modulation terminal equipment as claimed in claim 19, wherein the second relay of said first holding means includes a second contact which supplies said one of said trunks with said fixed level when the second relay is ON.

23. A pulse code modulation terminal equipment as claimed in claim 21, wherein said timer has a break-contact and said third relay has a second break contact, and wherein said fault detection signal is supplied to said timer through the second break-contact of said third relay, and is supplied to said third relay through said break-contact of said timer.

24. A pulse code modulation terminal equipment as claimed in claim 23, wherein said second relay has a third make-contact, and wherein said fault detection signal passes through said third make contact of said second relay, and the second break-contact of said third rely, and is supplied to said timer, whereby said timer is turned ON when the fault detection signal is output from said multiplexer means.

25. A pulse code modulation terminal equipment as claimed in claim 19, wherein said first relay has a second two-position switch having first and second positions, and wherein said answer supervising means comprises a fourth relay to which said answer signal is supplied through the first position of said two-position switch of said fault.

26. A pulse code modulation terminal equipment as claimed in claim 25, wherein said fourth relay has a first make-contact, and said second holding means comprises the first make contact of said fourth relay through which a fixed level, is supplied, as said answer signal, to said multiplexer means.

27. A pulse code modulation terminal equipment as claimed in claim 26 wherein said fourth relay has a second make-contact, through which said fixed level is applied to the second position of said second two-position switch of said first relay.

28. A pulse code modulation terminal equipment as claimed in claim 14, wherein each of said first and second multiplexed digital signals is a multiplexed pulse code modulation signal.

* * * * *

UNITED STATES PATENT AND TRADEMARK OFFICE
CERTIFICATE OF CORRECTION

PATENT NO. : 4,912,699
DATED : March 27, 1990
INVENTOR(S) : TAKASHI NAGATO

It is certified that error appears in the above-identified patent and that said Letters Patent is hereby corrected as shown below:

Col. 1, line 28, "Committe)" should be --Committee)--;
line 30, "ha" should be --has--;
line 50, "line i" should be --line in--.

Col. 2, line 6, "transmitted t" should be --transmitted to--;
line 7, "for," should be --for--;
line 10, "thereby," should be --thereby--;
line 21, "visor" should be --visory--;
line 46, "equipment for," should be --equipment, for--;
line 52, "connected t" should be --connected to--.

Col. 3, line 17, "having equipments;" should be --having PCM terminal equipments;--;
line 22, "terminal in" should be --terminal equipment in--;
line 29, "PCM equipment" should be --PCM terminal equipment--.

UNITED STATES PATENT AND TRADEMARK OFFICE
CERTIFICATE OF CORRECTION

PATENT NO. : 4,912,699

DATED : March 27, 1990

INVENTOR(S) : TAKASHI NAGATO

It is certified that error appears in the above-identified patent and that said Letters Patent is hereby corrected as shown below:

Col. 4, line 36, "multiplexer 77" should be --multiplexer 7--.

Col. 5, line 27, "order o" should be --order of--;
line 49, "sor" should be --sory--.

Col. 6, line 9, "predetermine" should be --predetermined--;
line 21, "when n" should be --when no--;
line 33, "around" should be --ground--.

Col. 7, line 8, "ON" should be --ON--;
line 43, "process," should be --process--;
line 44 "break-contacts" should be --break-contact--;
line 46, "'sez'" should be --'sez',--;
line 49, "make" should be --make- --;
line 52, "make contacts" should be --make-contacts--.

UNITED STATES PATENT AND TRADEMARK OFFICE
CERTIFICATE OF CORRECTION

PATENT NO. : 4,912,699

DATED : March 27, 1990

INVENTOR(S) : TAKASHI NAGATO

It is certified that error appears in the above-identified patent and that said Letters Patent is hereby corrected as shown below:

```
Col.  8, line  5, "level Thereby" should be --level.  Thereby--
         line 55, "make contacts" should be --make-contacts--;
         line 57, "break contact" should be --break-contact--;
         line 58, "brea contacts" should be --break-contacts--;
         line 58, "make contacts" should be --make-contacts--;
         line 62, "make contacts" should be --make-contacts--;
         line 62, "ans, The" should be --'ans'.  The--;
         line 63, "make contacts" should be --make-contacts--.

Col. 10, line 17, "relay t" should be --relay to--;
         line 38, "equipment a" should be --equipment as--;
         line 45, "break contact," should be --break-contact,--;
         line 53, "make contact" should be --make-contact--;
         line 68, "make contact" should be --make-contact--.
```

UNITED STATES PATENT AND TRADEMARK OFFICE
CERTIFICATE OF CORRECTION

PATENT NO. : 4,912,699

DATED : March 27, 1990

INVENTOR(S) : TAKASHI NAGATO

It is certified that error appears in the above-identified patent and that said Letters Patent is hereby corrected as shown below:

```
Col. 12, line 16, "predetermine" should be --predetermined--;
         line 21, "make contact" should be --make-contact--;
         line 22, "break contact," should be --break-contact,--;
         line 24, "break contact" should be --break-contact--;
         line 25, "make contact" should be --make-contact--;
         line 34, "break contact," should be --break-contact,--;
         line 42, "make contact" should be --make-contact--;
         line 43, "relay," should be --relay--;
         line 56, "make contact" should be --make-contact--;
         line 57, "level," should be --level--.
```

Signed and Sealed this

Twenty-ninth Day of October, 1991

Attest:

HARRY F. MANBECK, JR.

*Attesting Officer*  *Commissioner of Patents and Trademarks*